United States Patent
Collard et al.

(10) Patent No.: US 8,175,994 B2
(45) Date of Patent: May 8, 2012

(54) METHOD AND SYSTEM FOR SELF-LEARNING ISSUES REMEDIATION

(75) Inventors: Christopher Collard, Austin, TX (US); John Igoe, Lexington, MA (US)

(73) Assignee: Dell Products L.P., Round Rock, TX (US)

( * ) Notice: Subject to any disclaimer, the term of this patent is extended or adjusted under 35 U.S.C. 154(b) by 547 days.

(21) Appl. No.: 12/418,119

(22) Filed: Apr. 3, 2009

(65) Prior Publication Data

US 2010/0257132 A1   Oct. 7, 2010

(51) Int. Cl.
*G06F 17/00* (2006.01)
*G06F 3/00* (2006.01)
*G06F 11/00* (2006.01)

(52) U.S. Cl. .............. 706/45; 706/47; 710/5; 714/100
(58) Field of Classification Search .................. None
See application file for complete search history.

(56) References Cited

U.S. PATENT DOCUMENTS

| | | | |
|---|---|---|---|
| 2005/0097070 | A1 | 5/2005 | Enis et al. |
| 2007/0112919 | A1 | 5/2007 | Lyle et al. |
| 2007/0118623 | A1 | 5/2007 | Fortin et al. |
| 2008/0065700 | A1 * | 3/2008 | Lim .............................. 707/200 |

* cited by examiner

*Primary Examiner* — Alan Chen
(74) *Attorney, Agent, or Firm* — Hamilton & Terrile, LLP; Stephen A. Terrile

(57) ABSTRACT

A system and method are disclosed for automatically performing remediation operations on a plurality of information handling system (IHS) resources. Survey information related to a user of IHS resources is collected and processed to generate survey information. IHS resources used by the user are determined and associated configuration and operational information is collected and processed to generate imported information. The survey information and the imported information are then processed to generate state analysis information, which is then compared to a plurality of health baseline information. The results of the comparison operations are used to determine individual IHS resources not conforming to predetermined health baseline parameters. If an individual IHS resource does not conform to the predetermined health baseline parameters, then a remediation operation is automatically performed on the individual IHS resource.

16 Claims, 10 Drawing Sheets

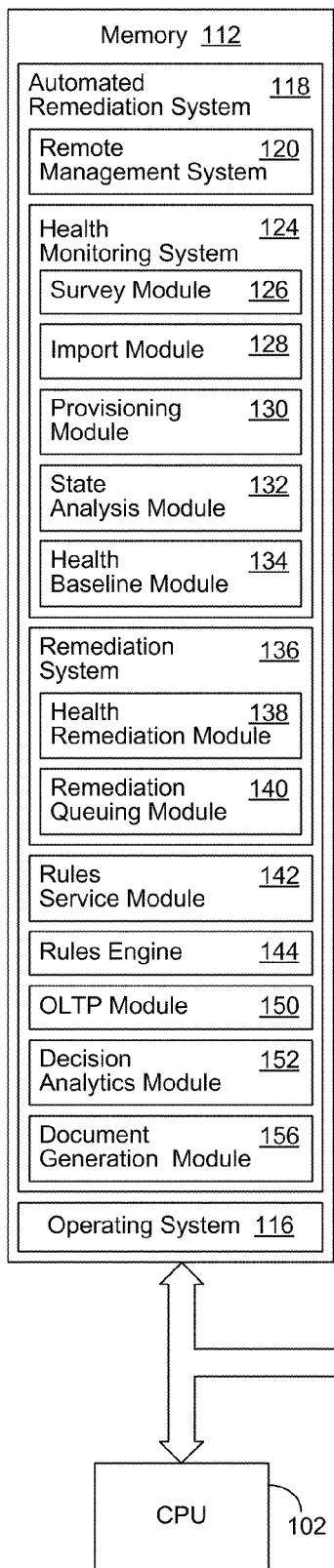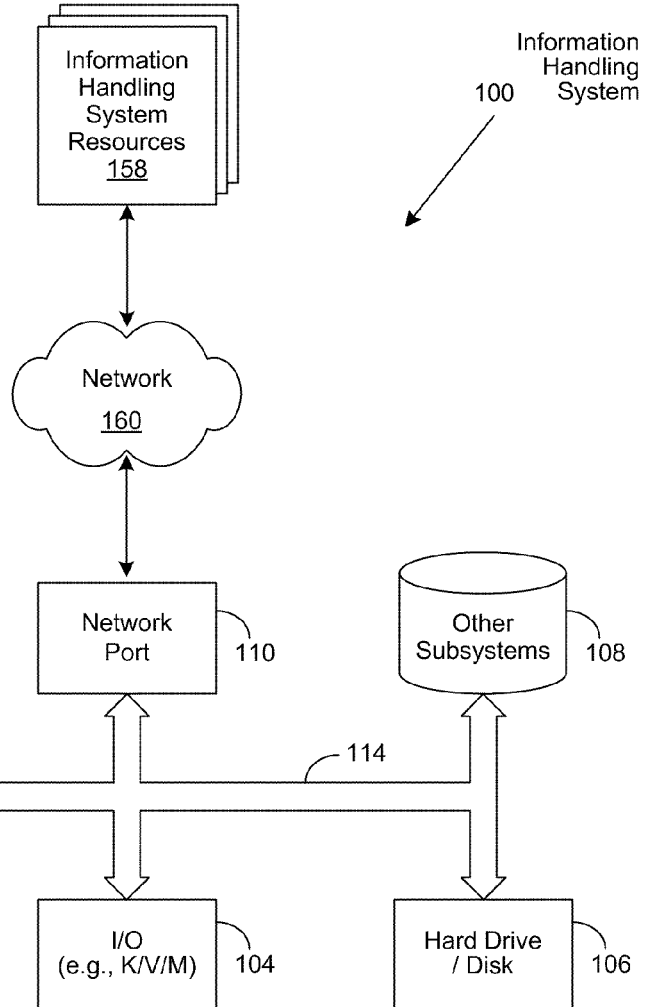
Figure 1

| Base 410 | Asset Discovery 412 | Asset Mgmt. 414 | Software Distribution 416 | SW Lic. Mgmt. 418 | Patch Mgmt. 420 | Malware Mgmt. 422 | Online Backup 424 | Remote Support 426 | Remote Access 428 | Data Encryption 430 | Connector APIs 432 |
|---|---|---|---|---|---|---|---|---|---|---|---|
| HW Inventory | Agentless HW Inventory | HW Changes | Package Creation | Enhanced SW Inventory | Patch Policies | OS Firewall Reporting | Internet Based | Not Integrated | Integrated | Internet Based | Service Desk |
| Site Creation | IP Device Discovery | HW Reports | Intelligent Package Distribution | SW Purchase Information | Automatic Patching | OS Firewall Config. | Electronic Distribution | Technician Based | Device Based | Electronic Distribution | Service Offering |
| Bandwidth Policies | Agentless SW Inventory | LAN Based Remote Control | Distribution Monitoring | SW Usage | Directed Multi-Patching | Initiate Virus Scan | Usage Reporting | Web Remote Control | Web Remote Control | Config. Mgmt. | SLA |
| Send Message to Device | Agentless Patch Inventory | HW Inventory Search | End User Portal | SW Changes | Uninstall Patches | Virus Detection | End User Self Service | End-User Initiated | End-User Auto Accept | Integrated | Billing |
| User Mgmt. | | Basic Inventory Search | | SW Reports | Patch OS | Monitor Definition Files | Remote Initiation of Backup | Remote Reboot/ Reconnect | Session Tracking | | Reports |
| Advanced Search | | Active Directory Sync | | SW Inventory Search | Patch Office | Force Definition Files | Config. Mgmt. | Screen/ Keyboard Lock | Remote Reboot/ Reconnect | | Analytics |
| Dash-boards | | Device Purchase Information | | SW License Reports | Patch Apps. | CE Supported | | Session Recording | Screen/ Keyboard Lock | | Views |

406 Plug-In Base

*Figure 4a*

| 406 Plug-In Base | | | | | | | | | | | | | | | | | |
|---|---|---|---|---|---|---|---|---|---|---|---|---|---|---|---|---|---|
| Base 410 | Asset Discovery 412 | Asset Mgmt. 414 | Software Distribution 416 | SW Lic. Mgmt. 418 | Patch Mgmt. 420 | Malware Mgmt. 422 | Online Backup 424 | Remote Support 426 | Remote Access 428 | Data Encryption 430 | Connector APIs 432 | Browser | CRM | CMDB | SD | RE | Ticket/ Orch | DW | SQL |
| Data Export | | Site Resolver | | SW License Discovery | AU Mgmt. | Virus Scan Supported | | | Session Recording | | | | | | | | | | |
| Remote Deployment | | | | Remote SW Uninstall | | SAV Firewall Mgmt. | | | Electronic Distribution | | | | | | | | | | |
| Web Services | | | | | | Firewall Mgmt. | | | | | | | | | | | | | |
| Alerts and Notifications | | | | | | | | | | | | | | | | | | | |
| Localization | | | | | | | | | | | | | | | | | | | |

*Figure 4b*

METHOD AND SYSTEM FOR SELF-LEARNING ISSUES REMEDIATION

BACKGROUND OF THE INVENTION

1. Field of the Invention

The present invention relates to the management of information handling systems. More specifically, embodiments of the invention provide a system and method for automatically performing remediation operations on a plurality of information handling system resources.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, the growing number, complexity, and diversity of these systems poses significant challenges to today's information technology (IT) executive, not the least of which is monitoring their operation to assure they are operating properly. Another challenge is providing pro-active maintenance and responsive remediation of systems deemed out of acceptable tolerance limits. Today, remediation of system issues extends beyond computing hardware to include operating systems, software applications, network connectivity, and effective access to the information resources users require to be productive. In the past, a "one size fits all" approach was been taken in an attempt to minimize support issues. However, such approaches resulted in some users being allocated insufficient resources while resources allocated to other users were underutilized or not used at all.

Attempts to address this issue have often included having a relatively small number of standardized system, application, and connectivity configurations. More recent approaches have included virtualization, where physical resources are collectively managed as virtual machines, each assigned to specific users or applications. These efforts have been facilitated with the advent of technologies such as storage area networks (SANs), where large volumes of storage are networked together and accessed by a network connection. In parallel, advances in network technologies allow high-speed access to data, even from mobile devices.

More recently, the concept of flex computing has come into vogue. Flex computing allows a computing environment to be custom-tailored to the needs of individual users. As their needs change, the computing environment can be adjusted to adapt to changing requirements.

However, these new approaches also create new support and remediation challenges, not the least of which are addressing issues of accuracy, consistency, and speed of issue resolution. Currently, determining effective remediations is typically by trial and error, and their execution or application relies on manual processes, which are time-consuming, costly, and error-prone. Furthermore, existing monitoring and management systems rely on the manual entry of known remediations. They are not added automatically once their effectiveness has been validated. In view of the foregoing, there is a need for automatically determining an optimum remediation and then automatically applying the remediation to the affected information handling system resource with no, or limited, human intervention. In addition, there is a need to minimize the amount of manual authoring while simultaneously increasing the level of consistency and accuracy of remediations.

SUMMARY OF THE INVENTION

A system and method are disclosed for automatically performing remediation operations on a plurality of information handling system (IHS) resources. In various embodiments, survey information related to a user of IHS resources is collected and then processed by a survey module to generate survey information. IHS resources used by the user are determined and associated configuration and operational information is collected. In various embodiments, the configuration information and the operational information are automatically collected by a remote management system. In these and various other embodiments, the configuration information related to the IHS resources is stored in a Configuration Management Database (CMDB). In one embodiment, the automatically collected configuration information and operational information is provided by the remote management system to an import module. Once provided, the collected configuration information and operational information is processed by the import module to generate imported information.

The survey information and the imported information are then processed by a state analysis module to generate state analysis information, which is then compared to a plurality of health baseline information by the health baseline module. The results of the comparison operations are then used by the state analysis module to determine individual IHS resources not conforming to predetermined health baseline parameters. If an individual IHS resource does not conform to the predetermined health baseline parameters, then a request for a remediation operation is generated by the health baseline module and submitted to a remediation queuing module for queuing. In turn, a health remediation module receives the queued remediation operation request from the remediation queuing module. Once received, the queued remediation operation is performed on the individual IHS resource by the health remediation module.

In various embodiments, the health remediation module performs the remediation operation using a decision analytics module, an online transaction processing (OLTP) module, and information provided by an operational data store (ODS). In one embodiment, the decision analytics module processes the operational information provided by the ODS to generate rules queries and to perform analysis operations related to the user's use of the IHS resources. The OLTP module likewise processes the operational information to generate rules queries and to perform rules processing transactions. In these and other embodiments, the rules service module receives requests for a rules query, submits the rules query to a rules engine, receives the results of the rules query from the rules engine, and provides the results of the rules query to the requester. In various embodiments, the rules engine comprises a plurality of rules referenced to a business object model (BOM). In one embodiment, the BOM comprises an extensible markup language (XML) schema. In various embodiments, the remediation operation comprise associated provisioning operations, which are performed by a provisioning module. Once the remediation operation is completed, a report reflecting the results of the remediation operation is generated by a document generation module.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 is a general illustration of components of an information handling system as implemented in the system and method of the present invention;

FIGS. 4a-b are a simplified block diagram of a plug-in module of a service delivery platform as implemented in accordance with an embodiment of the invention.

DETAILED DESCRIPTION

Figure 2:
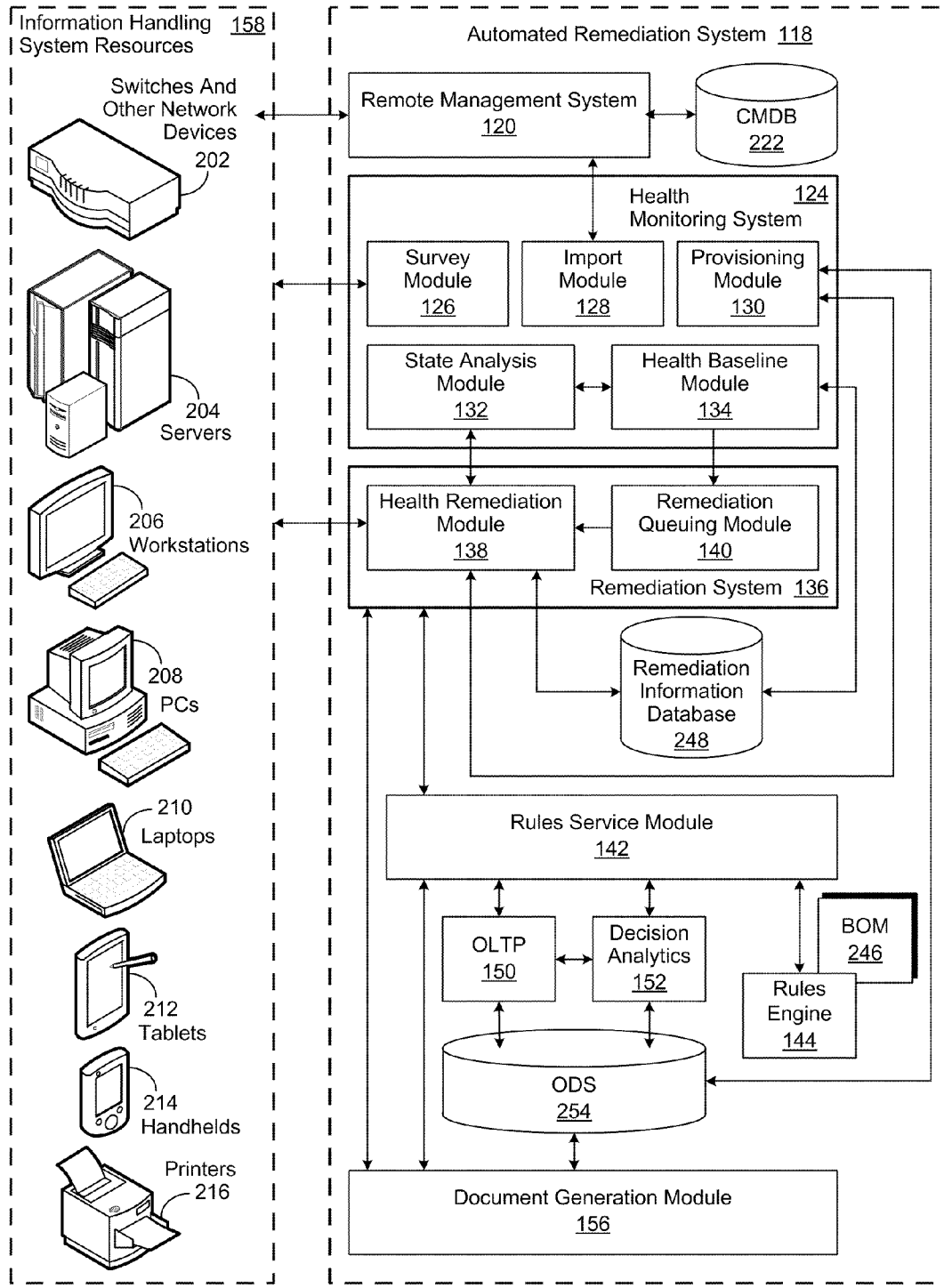
FIG. 2 is a simplified block diagram of an automated remediation system as implemented in accordance with an embodiment of the invention.

A system and method are disclosed for automatically performing remediation operations on a plurality of information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the method and system of the present invention. The information handling system 100 includes a processor (e.g., central processor unit or "CPU") 102, input/output (I/O) devices 104, such as a display, a keyboard, a mouse, and associated controllers, a hard drive or disk storage 106, various other subsystems 108, a network port 110 operable to connect to a network 160 to provide user access to a plurality of information handling system resources 158, and a system memory 112, all interconnected via one or more buses 114. The system memory 112 further comprises an operating system 116 and an automated remediation system 118. As described in greater detail herein, the automated remediation system 118 further comprises a remote management system 120, a health monitoring system 124, and a remediation system 136. The health monitoring system 124 further comprises a survey module 126, an import module 128, a provisioning module 130, a state analysis module 132, and a health baseline module 134. The remediation system 136 further comprises a health remediation module 138 and a remediation queuing module 140, likewise described in greater detail herein. Additionally, the automated remediation system 118 further comprises a rules service module 142, a rules engine 144, an online transaction processing (OLTP) module 150, a decision analytics module 152, and a document generation module 156.

FIG. 2 is a simplified block diagram of an automated remediation system as implemented in accordance with an embodiment of the invention. In various embodiments, automated remediation operations are performed on individual information handling system (IHS) resources 158 by an automated remediation system 118. As used herein, a remediation operation refers to a corrective, modification, or replacement action performed in relation to an IHS resource 158, its operation, or its usage by a user. For example, a corrective action may relate to changing the configuration settings for a personal computer's Basic Input/Output (BIOS) settings. As another example, a modification action may involve adding a disk drive to a personal computer, while a replacement action may relate to replacement of a defective disk drive in the same personal computer. It will be apparent to those of skill in the art that many such remediation operations are possible and the foregoing are not intended to limit the spirit, scope, or intent of the invention. In various embodiments, the automated remediation system 118 comprises a remote management system 120, a health monitoring system 124, and a remediation system 136. The health monitoring system 124 comprises a survey module 126, an import module 128, a provisioning module 130, a state analysis module 132, and a health baseline module 134 as described in greater detail herein. The remediation system 136 further comprises a health remediation queuing module 140 and a health remediation module 138 as likewise described in greater detail herein.

Survey information related to a user of IHS resources 158 is manually collected. As used herein, IHS resources 158 refer to any combination of devices, modules, systems, software, communication networks, processes, technologies, information, or resources used in the operation of the IHS resources 158. In various embodiments, IHS resources 158 may comprise switches and other network devices 202 used in a network, servers 204, workstations 206, personal computers 208, laptop computers 210, tablet computers 212, hand held devices 218 such as mobile telephones, scanners, and printers 216. The IHS resources 158 may also comprise resources for the operation of these resources such as the automated replenishment of in a printer or the exchanging of tape storage media in a tape drive.

As likewise used herein, survey information refers to information provided by a user 260 in response to a plurality of questions related to their past, current, or future use of a corresponding plurality of information handling system resources. In one embodiment, the survey information is collected as a result of the user responding to a set of formalized questions. In another embodiment the user is interviewed and the results of the interview are used to generate the survey information. In one embodiment, survey information is not manually collected, but provided by the selected user through an online interface to the automated remediation system 118. The collected survey information is then processed by the survey module 126 of the health monitoring system 124 to generate survey information.

The IHS resources 158 associated with the user's usage of the IHS resources 158 are determined and associated configuration and operational information is collected. As used herein, operational information refers to information related to a user's use of the individual IHS resources 158. In various embodiments, the configuration information and the operational information are automatically collected by a remote management system 120 as described in greater detail hereinbelow. In these and various other embodiments, the configuration information related to the IHS resources 158 is stored in a database such as a Configuration Management Database (CMDB) 222 familiar to those of skill in the art. In one embodiment, the automatically collected configuration information and operational information is provided by the remote management system 120 to an import module 128. Once provided, the collected configuration information and operational information is processed by the import module 128 to generate imported information. The survey information and the imported information are then stored in a database of remediation information 248.

Once stored, the survey information and the imported information are then processed by the state analysis module 132 of the health monitoring system 124 to generate state analysis information related to the IHS resources. Comparison operations are then performed between the state analysis information and a plurality of health baseline information by the health baseline module 134. In one embodiment, the plurality of health baseline information is provided to the health remediation module 138 by the health baseline module 140. The results of the comparison operations are then used by the state analysis module 132 to determine individual IHS resources 158 not conforming to predetermined health baseline parameters.

If an individual IHS resource 158 does not conform to the predetermined health baseline parameters, then a request for a remediation operation is generated by the health baseline module 134 and submitted to the remediation queuing module 140. In one embodiment, the requested remediation operation is appended to a queue of remediation requests generated by the remediation queuing module 140. The health remediation module 138 then receives the queued remediation operation request from the remediation queuing module. Once received, the queued remediation operation is performed on the individual IHS resource 158 by the health remediation module 138. In one embodiment, the health remediation module 138 provides modifications to predetermined health status parameters of the health baseline information as a result of the remediation operation.

In various embodiments, the health remediation module performs the remediation operation using a decision analytics module 152, an online transaction processing (OLTP) module 150, and information provided by an operational data store (ODS) 254 as described in greater detail herein. In various embodiments, the ODS 254 comprises operational information related to the IHS resources 158 and the user's 260 use thereof In one embodiment, the operational information stored in the ODS 254 is provided for use by the remote management system 120 for the monitoring of events and changes as described in greater detail herein. In various embodiments, the decision analytics module 152 processes the operational information provided by the ODS 254 to generate rules queries and to perform analysis operations related to the user's 260 use of the IHS resources 158. The OLTP module 150 likewise processes the operational information to generate rules queries and to perform rules processing transactions in various embodiments. In these and other embodiments, the rules service module receives requests for a rules query, submit the rules query to the rules engine 144, receive the results of the rules query from the rules engine 144, and provide the results of the rules query to the requestor. In various embodiments, the rules engine 144 comprises a plurality of rules referenced to a business object model (BOM) 246, wherein each of the plurality of rules defines at least one condition to be met and at least one action to be taken in response. In one embodiment, the BOM 246 comprises an extensible markup language (XML) schema. In various embodiments, the requester of the rules query may be the health monitoring system 124, the OLTP module 150, the decision analytics module 152, or the documentation generation module 156.

In various embodiments, the remediation operation may require the performance of provisioning operations by the provisioning module 130. As an example, the provisioning operations may include moving the user's data to a different virtual machine or from a localized data store to a storage area network. It will be apparent to those of skill in the art that many such provisioning operations are possible and the foregoing are offered as examples and are not intended to limit the spirit, scope or intent of the invention. Once the provisioning operations are completed, a report reflecting the success or failure of one or more remediation operations, a list of the remediation operations performed, and the current health status of the individual IHS resource is generated. In various embodiments, the document generation module 156 is used to provide state analysis information, health baseline information, and information related to the remediation operations in a predetermined format.

Figure 3:
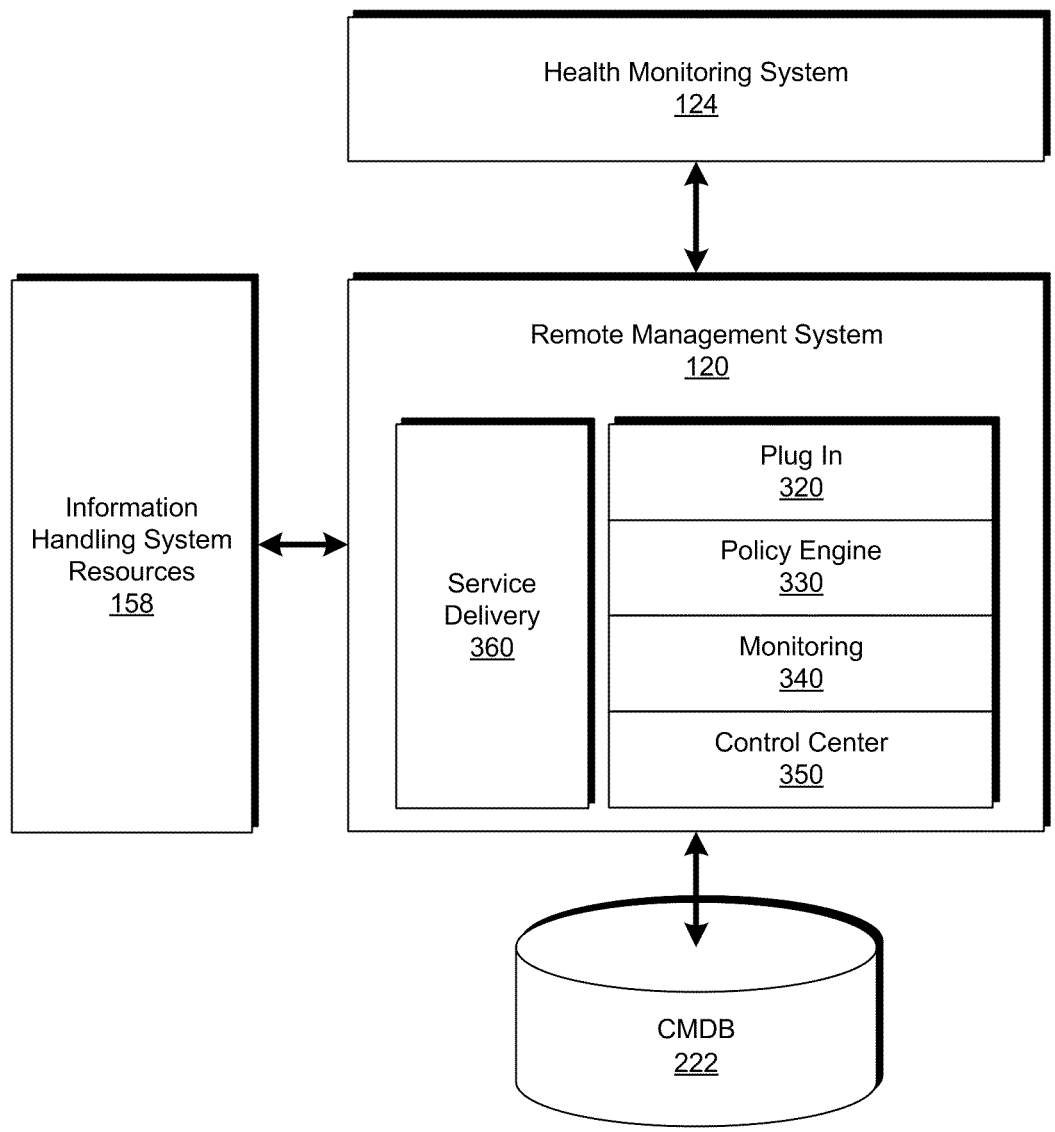
FIG. 3 is a simplified block diagram illustrating a remote management system as implemented in accordance with an embodiment of the invention.
Figure 5A:
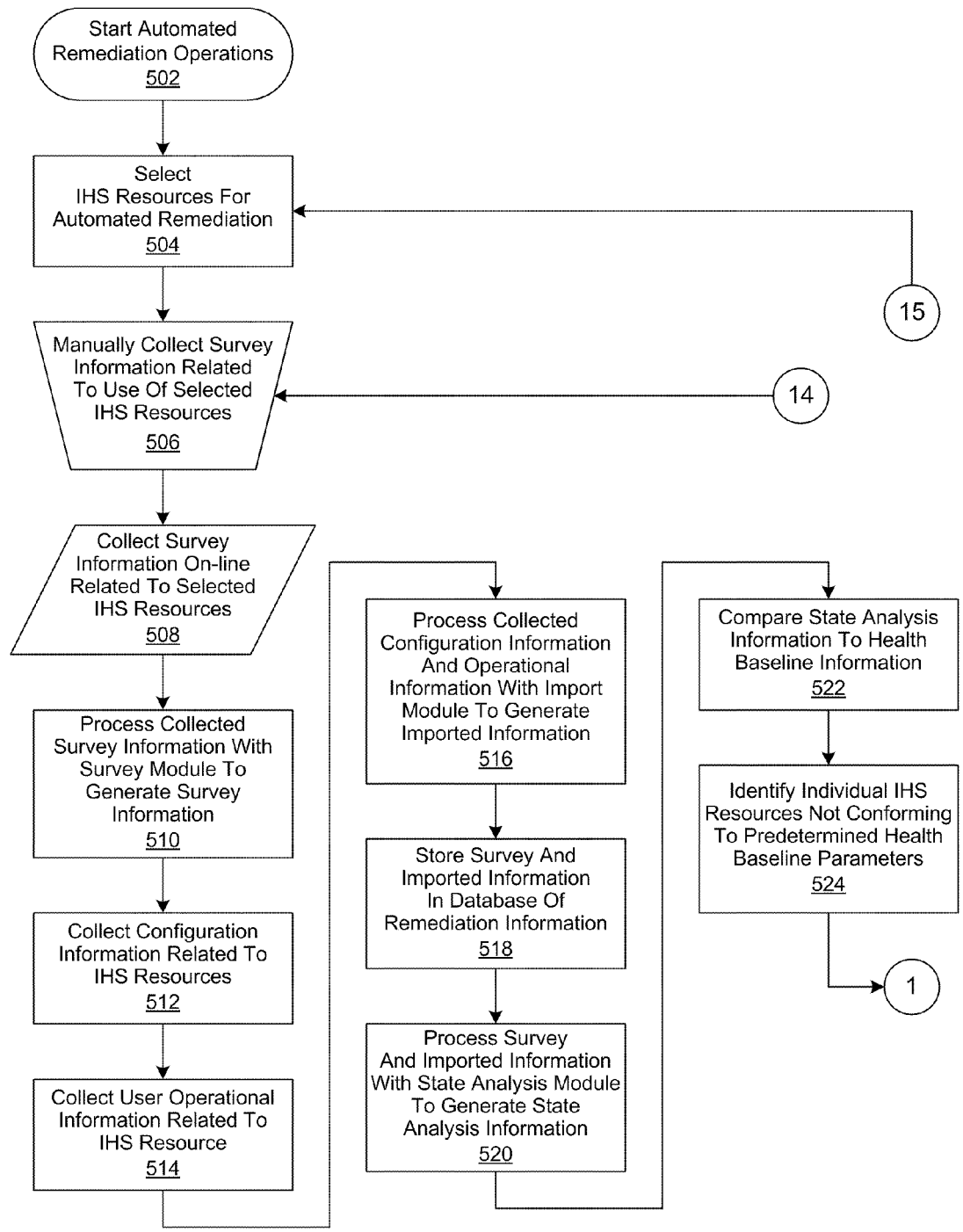
FIGS. 5a-e are a flow chart of the operation of an automated remediation system as implemented in accordance with an embodiment of the invention to perform remediation operations.
Figure 5B:
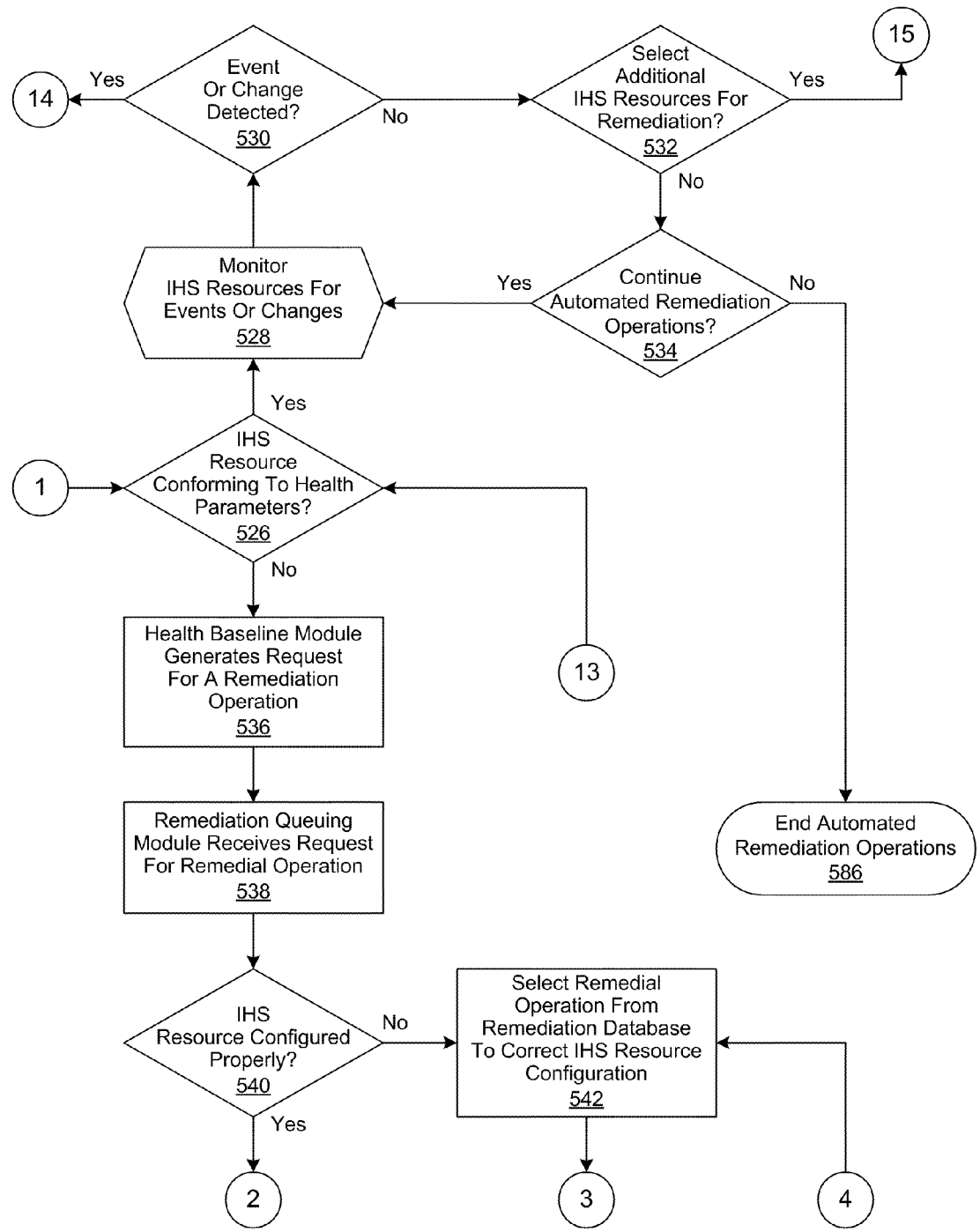
Figure 5C:
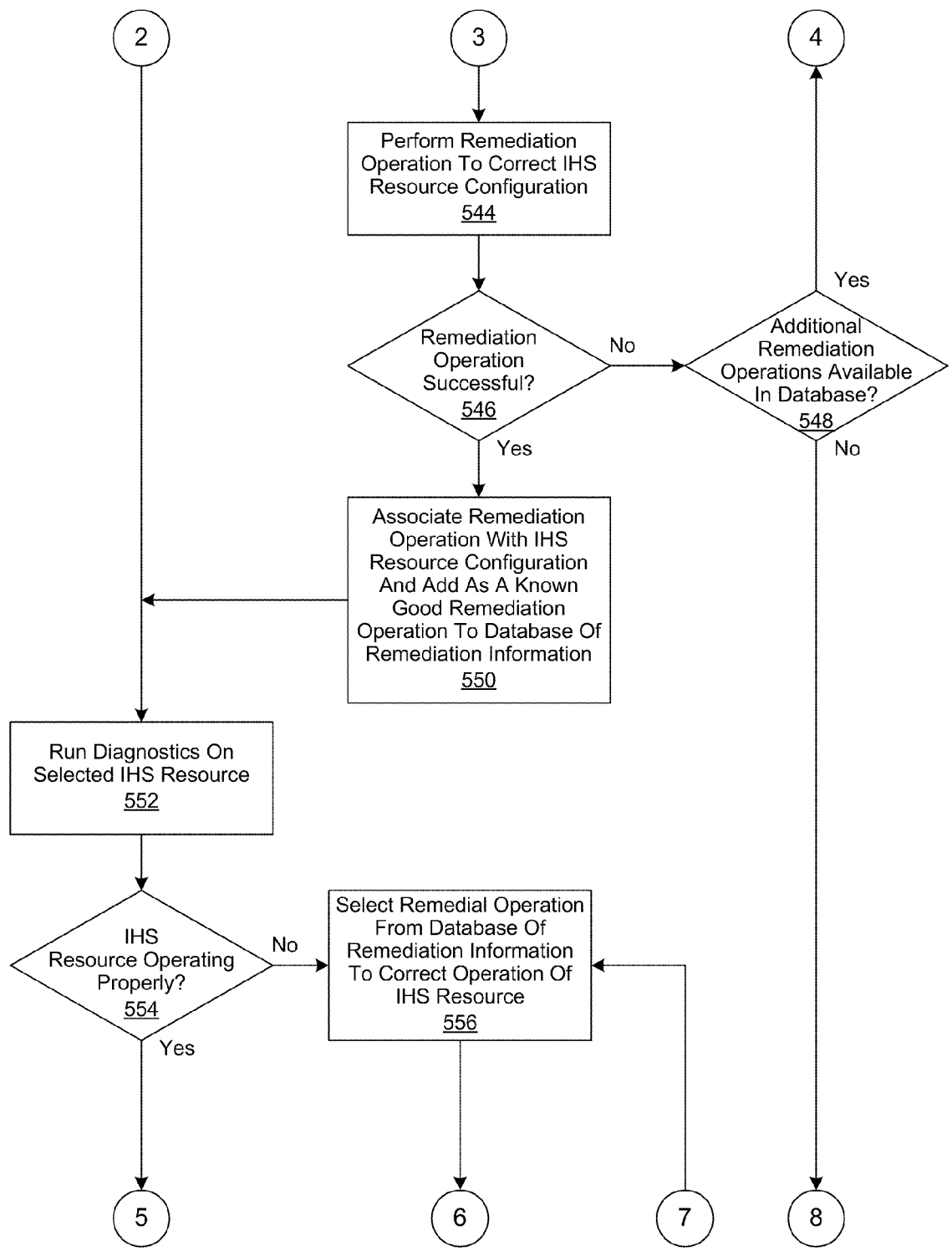
Figure 5D:
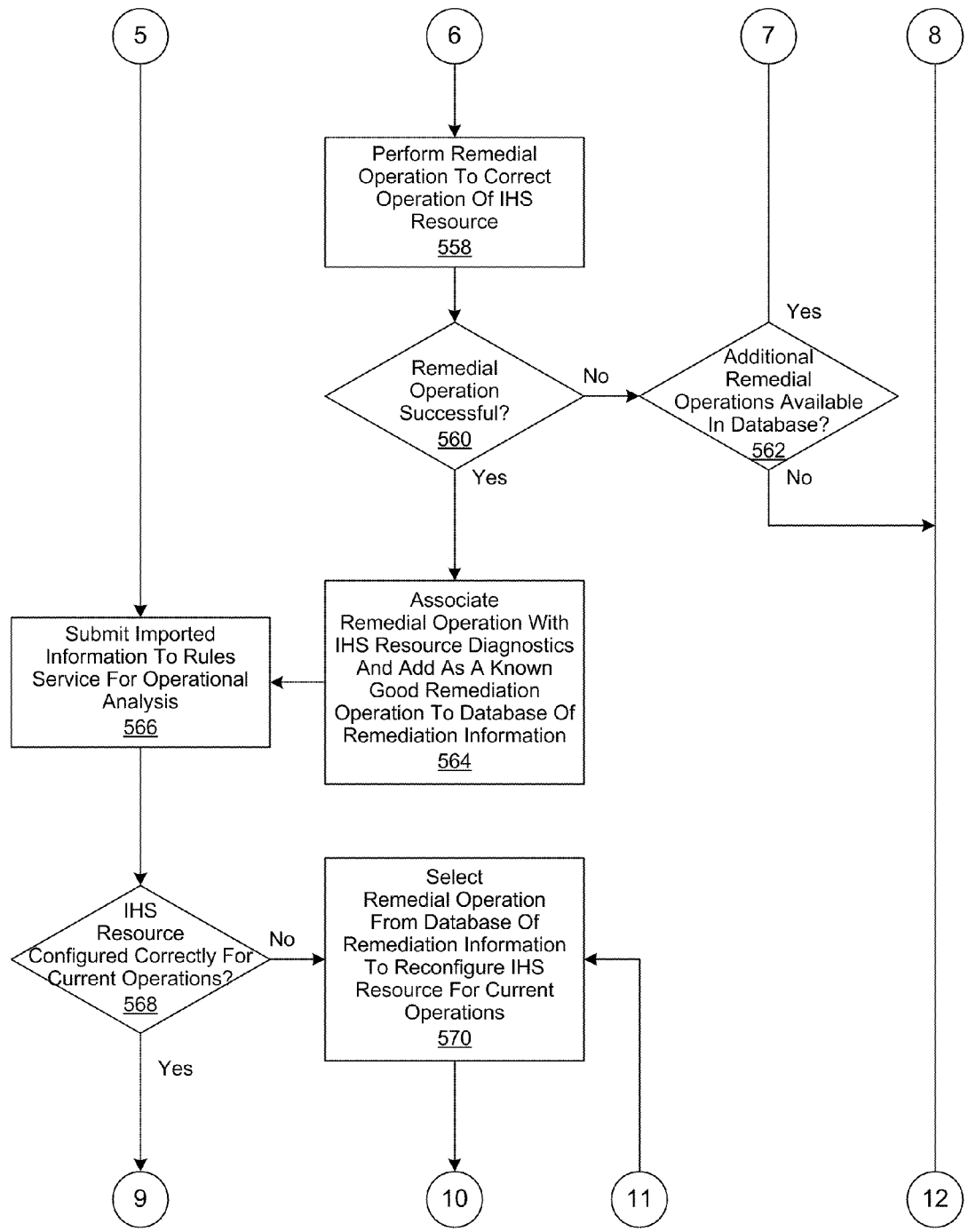
Figure 5E:
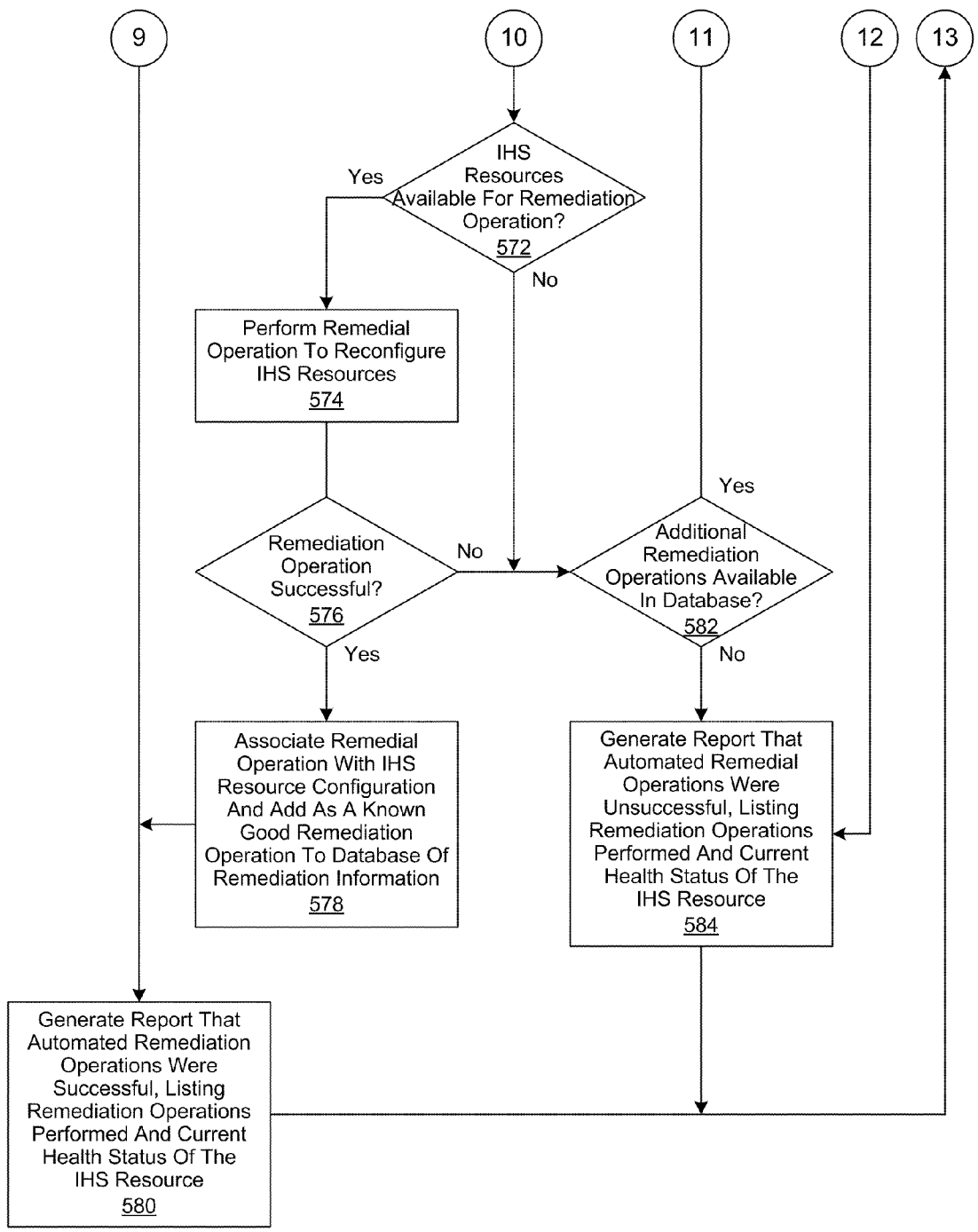

FIG. 3 is a simplified block diagram illustrating a remote management system 120 as implemented in accordance with an embodiment of the invention. The remote management system 120 comprises a plug-in module 320, a policy engine module 330, a monitoring module 340, a control center 350, and a service delivery module 360.

The plug-in module 320 allows various applications or functions to be selectively enabled and executed within the remote management system 120. The policy engine module 330 provides a policy administration function as well as intelligence regarding how to respond to events related to information handling system resources 158. The policy engine module 330 provides preferred action indications based upon service, configuration, and event information likewise related to information handling system resources 158. Likewise, the monitoring module 340 provides event level monitoring, license monitoring, and contract clause level monitoring of information handling system resources 158.

The control center 350 exposes a plurality of functions provided via the remote management system 120. More specifically, the control center 350 is delivers alerts based on events and data related to information handling system resources 158. The control center 350 also performs analytics functions which support reporting and analysis across device data, financial data, and application data gathered from the applications integrated within the remote management system 120. The control center 350 can also provide a user management function which allows administrators to maintain users in terms of roles, permissions, and a list of services a user is allowed to access. In addition, the control center 350 can provide a security function which supports security for sign-on, user access, and message encryption. Additionally, the control center 350 can provide a work flow function which provides work flow services to applications executing within the remote management system 120.

The service delivery platform 360 uses a combination of web services and command line application program interfaces (APIs) to support the integration of software applications and other functional components to deliver management services and provide functionality to the information handling system resources 158. The service delivery platform 360 can use services device agents resident on devices within an information technology (IT) environment comprising the information handling system resources 158. The service delivery platform 360 can also use a service appliance that communicates with the information handling system resources 158 within an IT environment.

Applications executing within the service delivery platform 360 may be delivered via an on-demand model as part of the remote management system 120 or may be provided via a third party service offering. The service delivery platform 360, through the use of the plug-in module 320, optionally and selectively supports service offerings such as asset management, virus protection, patch management, software distribution, and on-line backup. The service delivery platform 360, through the use of the policy engine module 330 and the monitoring module 340, also supports permissions management as well as service entitlement management functions, both of which can be provided via partners or independent software vendors who are making use of the remote management system 120. Permissions management allows user access to applications executing on the platform to be managed according to user specific roles and permissions associated with those roles. Service entitle management allows applications executing on the platform to deliver functionality based upon varying levels of service set by a customer or partner.

An IT environment can make use of service device agents deployed on individual information handling system resources 158 within the IT environment. The service device agents can provide a direct connection, such as through a network connection to the remote management system 120. The service device agents can execute either generic services or application specific services provided via the applications executing within the plug-in module 320. The service device agents and the service appliance provide an extensible mechanism for software download, inventory gathering, logging, diagnostics, and monitoring. The operations are accessible via a command line, API or Web Service (such as web services corresponding to standards set by the Web Services Interoperability Organization (WS-I)) on the agent or appliance and can be used by integration developers for integrating additional remote services functions. In various embodiments, the information collected via the service device agents or the service appliance is stored as configuration status information in a configuration management database (CMDB 222). In various embodiments, the information stored in CMDB 222 is provided by the remote management system 120 to the assessment profiling system 124, which then uses it to generate assessment information corresponding to the information handling system resources 158.

The service delivery platform 360 can include a plurality of application program interfaces (APIs). For example, the service delivery platform 360 can include user synchronization APIs which allow a service provider or third party to synchronize information with the remote management system 120. The service delivery platform 360 can also include data retrieval APIs which allow a service provider or third party to extract data from the service delivery platform 360.

Accordingly, the service delivery platform 360 can include customer-facing APIs which enable integration of existing data regarding users, software licenses, applications and other information that may be used by an application executing within the service delivery platform 360. The service delivery platform 360 can also include partner-facing APIs which enable partner service providers to link existing solutions, such as customer relationship management or service management, with the service delivery platform 360. As a result, these partner-facing APIs enable a partner using the service delivery platform 360 to deliver value added solutions on top of the service delivery platform, thereby facilitating multi-tier use of the service delivery platform 360. The service delivery platform 360 likewise enables the provision of remote services to customers at a service level agreement (SLA) level. Accordingly, a plurality of services may be provided to the customer where each of the services corresponds to a clause within a service level agreement.

In addition, the remote management system 120 enables and empowers a multi tier provision of remote services. With a multi tier provision of remote services, original equipment manufacturer (OEM) service providers or third party service providers can make use of the remote management system 120 to provide services to a customer where the actual location of the underlying remote management system 120 is transparent to the customer. Additionally, the remote management system 120 enables remote services to be provided using a software as a service (SaaS) business model, which in turn allows the provision of information technology as a service (ITaaS). Using this model, a customer might only be charged for the remote services that are actually used. In various embodiments, such charges are monitored by the monitoring module 340, with the actual supply chain for generated revenue provided by the remote management system 120.

The combination of the monitoring module 340 and the control center 350 facilitates reporting and billing of the services provided by the remote management system 120. Remote services provided via the SaaS model may also include other billing options such as subscription, pricing, flexible promotions and marketing, invoicing, financial management, payments, collections, partner relations, revenue analysis, and reporting. With zero or more subscriptions, balances, bills and payments per account, ITaaS pricing can include one-time, recurring, usage, or any event updatable payment method, flexibly based on tier, volume, time, zone attribute or customer. Bundling can include multi-service offerings, up-sell, cross-sell, discounts and promotions. Bundling can integrate a service offering registry with a service catalog management UT per tenant and tier to define a pricing scheme per event type, exclusion rules and dependencies, can create bundled offerings and manage price data or changes to any of these features. Balance management can include real-time threshold notification and balance updates. Service level balances may be provided with separate bills, credit limit monitoring, resource definition, management, and reservation with prepaid IT services. Multi-payment convergent accounts may be provided on a consolidated platform. A single partner or provider can view multiple balances, support sub-balances with validity dates. A service level can be balanced with separate bills and payment methods. Flexible promotions and rapid provider configuration enable marketing which can include quick response to a changing market and competitive purchase and upgrade incentives as well as select and group based promotions and volume and cross service discounts. It will be apparent to those of skill in the art that each of these typically has a corresponding configuration item residing in the CMDB 222. Furthermore, it will be equally apparent that each of the foregoing may be used in the generation of assessment information, whether for current or proposed information handling system resources 158, by the assessment profiling system 124.

FIGS. 4a-b are a simplified block diagram of a plug-in module 320 as implemented with a service delivery module 360 in accordance with an embodiment of the invention. The plug-in module 320 includes a plug-in base portion 406 which can optionally include any combination of a plurality of plug-in functions. The plug-in base module 406 can control which of the plurality of plug-in functions to which a particular remote service customer might have access. Additionally, the plug-in base module 406 interacts with the monitoring module 340 to enable a remoter services provider to track and bill for each of the enabled plug-in functions.

In certain embodiments, the plug-in functions can include one or more of a base function 410, an asset discovery function 412, an asset management function 414, a software distribution function 416, a software license management function 418, a patch management function 420, an anti-malware management function 422, an online backup function 424, a remote support function 426, a remote access function 428, a data encryption function 430, and a connector API function 432. By providing these functions within the plug-in module 320, it is possible to allow a service provider to easily add or remove functionality to the remote services that are being provided to a particular customer via the service delivery module 360.

Each of the plurality of plug-in functions can include one or more plug-in applications or application-like service independent building blocks (SIBB). For example, the base function can include a hardware inventory application, a site creation application, a bandwidth policy application, a send message to device application, a user management application, an advanced search application, a dashboard application, a data export application, a remote deployment application, a web services application, an alerts and notifications application and a localization application. The various applications may be different brands of applications, different applications within a brand or different versions within the application. The SIBB plug-in functions can include subparts of applications, which may include separate service offerings as well as additional extensible markup language (XML) document type definitions (DTDs) or schema and their integrations.

By providing these functions within the plug-in module 320 it is possible for a service provider to easily change a type of application for each of the functions. As an example, a customer might desire changing from a first brand or version of anti virus software application to another brand or version of anti virus software application, or more than one type of application (e.g., for multiple customer sites, for legacy applications or for acquisitions within the customer IT environment). As will likewise be appreciated by those of skill in the art, each of these will generally have a corresponding configuration item stored in the CMDB 222. As such, the assessment profiling system 124 is operable in various embodiments to generate a assessment information for each, and by extension, assessment information for a predetermined target group of corresponding information handling system resources 158.

FIGS. 5a-e are a flow chart of the operation of an automated remediation system as implemented in accordance with an embodiment of the invention to perform remediation operations. In various embodiments, the automated remediation system comprises a remote management system, a health monitoring system, and a remediation system. The health monitoring system comprises a survey module, an import module, a provisioning module, a state analysis module, and a health baseline module as described in greater detail herein. The remediation system further comprises a health remediation queuing module and a health remediation module as likewise described in greater detail herein.

In this embodiment, automated remediation operations are begun in step 502, followed by the selection of an information handling system (IHS) resource for automated remediation in step 504. As used herein, a remediation operation refers to a corrective, modification, or replacement action performed in relation to an IHS resource, its operation, or its usage by a user. For example, a corrective action may relate to changing the configuration settings for a personal computer's Basic Input/Output (BIOS) settings. As another example, a modification action may involve adding a disk drive to a personal computer, while a replacement action may relate to replacement of a defective disk drive in the same personal computer. It will be apparent to those of skill in the art that many such remediation operations are possible and the foregoing are not intended to limit the spirit, scope, or intent of the invention.

In step 506 survey information related to a user of the selected IHS resource is manually collected. As used herein, IHS resources refer to any combination of devices, modules, systems, software, communication networks, processes, technologies, information, or resources used in the operation of the IHS resources. In various embodiments, IHS resources may comprise switches and other network devices used in a network, servers, workstations, personal computers, laptop computers, tablet computers, hand held devices such as mobile telephones, scanners, and printers. The IHS resources may also comprise resources for the operation of these resources such as the automated replenishment of in a printer or the exchanging of tape storage media in a tape drive.

As likewise used herein, survey information refers to information provided by a user in response to a plurality of questions related to their past, current, or future use of a corresponding plurality of IHS resources. In one embodiment, the survey information is collected as a result of the user responding to a set of formalized questions. In another embodiment the user is interviewed and the results of the interview are used to generate the survey information. In step 508, survey information not manually collected, but instead provided by a user through an online interface to a health monitoring system, is collected. The collected survey information is then processed by the survey module of the health monitoring system in step 510 to generate survey information.

Configuration information associated with the IHS resource is collected in step 512 followed by the collection of user operational information related to the IHS resource in step 514. As used herein, operational information refers to information related to a user's use of the IHS resource. In various embodiments, the configuration information and the operational information are automatically collected by a remote management system described in greater detail herein. In these and various other embodiments, the configuration information related to the plurality of IHS resource is stored in a database such as a Configuration Management Database (CMDB) familiar to those of skill in the art. In one embodiment, the automatically collected configuration information and operational information is provided by the remote management system to the import module of the health monitoring system. Once provided, the collected configuration information and operational information is processed by the import module of the health monitoring system to generate imported information in step 516. The survey information and the imported information are then stored in a repository of remediation information in step 518.

Once stored, the survey information and the imported information are then processed in step 520 by the state analysis module of the health monitoring system to generate state analysis information. Comparison operations are then performed by the state analysis module in step 522 between the state analysis information and a plurality of health baseline information. The results of the comparison operations are then used by the state analysis module in step 524 to determine individual IHS resources not conforming to predetermined health baseline parameters.

A determination is then made in step 526 by the health baseline module whether the results of the comparison operations indicate the IHS resources are conforming to predetermined health baseline parameters. If so, then monitoring of the selected IHS resource for events or changes is initiated in step 528. A determination is then made in step 530 whether an event or a change has been detected. If so, then the process continues, proceeding with step 506. Otherwise, a determination is made in step 532 whether additional IHS resources are to be selected for automated remediation operations. If so, then the process continues, proceeding with the selection of an IHS resource for automated remediation operations in step 504. Otherwise, a determination is made in step 534 whether to continue automated remediation operations. If so, then the process continues, proceeding with step 528. Otherwise, automated remediation operations are ended in step 586.

However, if it is determined in step 526 that an individual IHS resource is not conforming to predetermined health baseline parameters, then a request for a remediation operation is generated in step 536 by the health baseline module and submitted to the remediation queuing module. In one embodiment, the requested remediation operation for the individual IHS resource is appended to a queue of remediation requests generated by the remediation queuing module. The health remediation module then receives the queued remediation operation request from the remediation queuing module in step 538.

Once received, a determination is made by the health remediation module in step 540 whether the IHS resource is properly configured. If not, then a remedial operation is selected from the repository of remediation information by the health remediation module in step 542 to correct the configuration of the IHS resource. In one embodiment, the health mediation module selects the remediation operation using a rules service module, a decision analytics module, and information provided by an operational data store (ODS) as described in greater detail herein. The remediation operation to correct the configuration of the IHS resource is then performed in step 544.

The results of the remediation operation are then are then analyzed in step 546 and a determination is made whether the remediation operation was successful. If not, then a determination is made in step 548 whether additional remediation operations are available in the repository of remediation operation. If so, then the process is repeated, proceeding with step 542. However, if it was determined in step 546 that the remediation operation was successful, then it is associated with the HIS resource configuration and added as a known good remediation operation to the repository of remediation information in step 550. Afterwards, or if it was determined in step 540 that the IHS resource was properly configured, then diagnostics are run on the selected HIS resource in step 552.

A determination is then made in step 554 whether the IHS resource is operating properly. If not, then a remedial operation is selected from the repository of remediation information by the health remediation module in step 556 to correct the operation of the IHS resource. In one embodiment, the health mediation module selects the remediation operation using a rules service module, a decision analytics module, and information provided by an operational data store (ODS) as described in greater detail herein. The remediation operation to correct the operation of the IHS resource is then performed in step 558.

The results of the remediation operation are then are then analyzed in step 560 and a determination is made whether the remediation operation was successful. If not, then a determination is made in step 562 whether additional remediation operations are available in the repository of remediation operation to correct the operation of the IHS resource. If so, then the process is repeated, proceeding with step 542. However, if it was determined in step 560 that the remediation operation was successful, then it is associated with the IHS resource diagnostics and added as a known good remediation operation to the repository of remediation information in step 564. Afterwards, or if it was determined in step 554 that the IHS resource was operating properly, then the imported information generated in step 516 is submitted to a rules service module for operational analysis in step 566.

A determination is then made in step 568 whether the IHS resource is configured properly for current usage operations. If not, then a remedial operation is selected from the repository of remediation information by the health remediation module in step 570 to correct the configuration of the IHS resource for current usage operations. In one embodiment, the health mediation module selects the remediation operation using a rules service module, a decision analytics module, and information provided by an operational data store (ODS) as described in greater detail herein.

A determination is then made in step 572 whether IHS resources are available to perform the remedial operation. As an example, a user may be performing database operations on a database running on a virtual machine and the database operations may require additional disk space. The remediation operation would be to increase the amount of disk space allocated to the virtual machine. However, if the virtual machine host has already allocated all available disk resources to other users, then there are insufficient IHS resources available to perform the remediation operation. If it is determined in step 572 that there are IHS resources available to perform the remediation operation, then it is performed in step 574.

The results of the remediation operation are then are then analyzed in step 576 and a determination is made whether the remediation operation was successful. If not, or if it is determined in step 572 that IHS resources are not available for the remediation operation, then a determination is made in step 582 whether additional remediation operations are available in the repository of remediation operation to correct the configuration of the IHS resource for current operations. If so, then the process is repeated, proceeding with step 570. However, if it was determined in step 576 that the remediation operation was successful, then it is associated with the IHS configuration for current operations and added as a known good remediation operation to the repository of remediation information in step 578. Afterwards, or if it was determined in step 568 that the IHS resource was configured properly for current operations, then a report is generated in step 580, stating that remediation operations were successful, the remediation operations performed, and the current health status of the IHS resource. The process is then continued, proceeding with step 526. However, if it was determined that additional remediation operations were not available in the repository of remediation information in step 548, step 562, or step 582, then a report is generated in step 584, stating that remediation operations were unsuccessful, the remediation operations performed, and the current health status of the IHS resource. The process is then continued, proceeding with step 526.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for providing automated remediation, comprising:
    a health monitoring system operable to generate health status information related to a plurality of information handling system resources and a plurality of user's use thereof, the health monitoring system further comprising:
        a survey module operable to process manually provided information related to the plurality of information handling system resources the plurality of user's use thereof to generate survey information;
        an import module operable to process automatically collected information related to the configuration status of the plurality of information handling system resources and the plurality of user's use thereof to generate imported information; and
        a provisioning module operable to perform provisioning operations related to the plurality of information handling system resources and the plurality of user's use thereof;
        a state analysis module operable to use the survey information and the imported information to generate state analysis information related to the plurality of information handling system resources; perform comparison operations between the state analysis information and a plurality of health baseline information; and determine individual information handling system resources not conforming to predetermined health status parameters associated with the plurality of health baseline information; and
    a remediation system operable to use the health status information to perform remediation operations on the plurality of information handling system resources.

2. The system of claim 1, wherein the health monitoring system further comprises:
    a health baseline module operable to:
        provide the plurality of health baseline information to the state analysis module;
        receive modifications to the predetermined health status parameters associated with the plurality of health baseline information; and
        generate a request for a remediation operation to be performed on the individual information handling system resources not conforming to the predetermined health status parameters.

3. The system of claim 1, wherein the remediation system further comprises:
    a remediation queuing module operable to:
        receive remediation operation requests from the health monitoring system; and
        process the remediation operation requests to generate a queue of remediation operation requests.

4. The system of claim 1, wherein the remediation system further comprises:
    a health remediation module operable to:
        receive a queued remediation operation request from the remediation queuing module;
        perform associated remedial operations on the related individual information handling system resources; and
        provide modifications to the predetermined health status parameters associated with the plurality of health baseline information.

5. The system of claim 1, further comprising:
    an operational data store (ODS) comprising operational information related to the plurality of information handling system resources and the plurality of user's use thereof;
    an online transaction processing (OLTP) module operable to process the operational information to generate rules queries and to perform rules processing transactions; and
    a decision analytics module operable to process the operational information to generate rules queries and to perform analysis operations.

6. The system of claim 1, further comprising:
    a repository of known good remediation operations performed by the remediation system,
    a rules engine comprising a plurality of rules referenced to a business object model, wherein each of the plurality of rules defines at least one condition to be met and at least one action to be taken in response and the business object module comprises an extensible markup language (XML) schema;
a rules service module operable to receive a request for a rules query, submit the rules query to the rules engine, receive the results of the rules query from the rules engine, and provide the results of the rules query to the requestor; and
a document generation module operable to provide the state analysis information, the health baseline information, and information related to the remediation operations in a predetermined format.

7. The system of claim 1, further comprising:
a remote management system operable to:
automatically collect information related to the configuration status of the plurality of information handling resources and the plurality of user's use thereof as automatically collected information; and
provide the automatically collected information to the import module of the health monitoring system.

8. The system of claim 7, wherein the configuration status information related to the plurality of information handling resources is stored in a configuration management database (CMDB).

9. A method for providing automated remediation, comprising:
using a health monitoring system to generate health status information related to a plurality of information handling system resources and a plurality of user's use thereof;
using a remediation system to use the health status information to perform remediation operations on the plurality of information handling system resources;
using a survey module to process manually provided information related to the plurality of information handling system resources the plurality of user's use thereof to generate survey information;
using an import module to process automatically collected information related to the configuration status of the plurality of information handling system resources and the plurality of user's use thereof to generate imported information; and
using a provisioning module to perform provisioning operations related to the plurality of information handling system resources and the plurality of user's use thereof;
using the survey information and the imported information to generate state analysis information related to the plurality of information handling system resources;
performing comparison operations between the state analysis information and a plurality of health baseline information; and
determining individual information handling system resources not conforming to predetermined health status parameters associated with the plurality of health baseline information.

10. The method of claim 9, wherein the health monitoring system further comprises:
using a health baseline module to:
provide the plurality of health baseline information to generate the state analysis;
receive modifications to the predetermined health status parameters associated with the plurality of health baseline information; and
generate a request for a remediation operation to be performed on the individual information handling system resources not conforming to the predetermined health status parameters.

11. The method of claim 9, wherein the remediation system further comprises:
using a remediation queuing module to:
receive remediation operation requests from the health monitoring system; and
process the remediation operation requests to generate a queue of remediation operation requests.

12. The method of claim 9, wherein the remediation system further comprises:
using a health remediation module to:
receive a queued remediation operation request from the remediation queuing module;
perform associated remedial operations on the related individual information handling system resources; and
provide modifications to the predetermined health status parameters associated with the plurality of health baseline information.

13. The method of claim 9, further comprising:
using an operational data store (ODS) comprising operational information related to the plurality of information handling system resources and the plurality of user's use thereof;
using an online transaction processing (OLTP) module to process the operational information to generate rules queries and to perform rules processing transactions; and
using a decision analytics module to process the operational information to generate rules queries and to perform analysis operations.

14. The method of claim 9, further comprising:
using a repository of known good remediation operations performed by the remediation system,
using a rules engine comprising a plurality of rules referenced to a business object model, wherein each of the plurality of rules defines at least one condition to be met and at least one action to be taken in response and the business object module comprises an extensible markup language (XML) schema;
using a rules service module to receive a request for a rules query, submit the rules query to the rules engine, receive the results of the rules query from the rules engine, and provide the results of the rules query to the requestor; and
using a document generation module to provide the state analysis information, the health baseline information, and information related to the remediation operations in a predetermined format.

15. The method of claim 9, further comprising:
using a remote management system to:
automatically collect information related to the configuration status of the plurality of information handling resources and the plurality of user's use thereof as automatically collected information; and
provide the automatically collected information to the import module of the health monitoring system.

16. The method of claim 15, wherein the configuration status information related to the plurality of information handling resources is stored in a configuration management database (CMDB).

* * * * *